(No Model.)
J. KELLER.
DEVICE FOR RAISING AND LOWERING HARVESTERS OR GRAIN BINDERS.
No. 412,627. Patented Oct. 8, 1889.
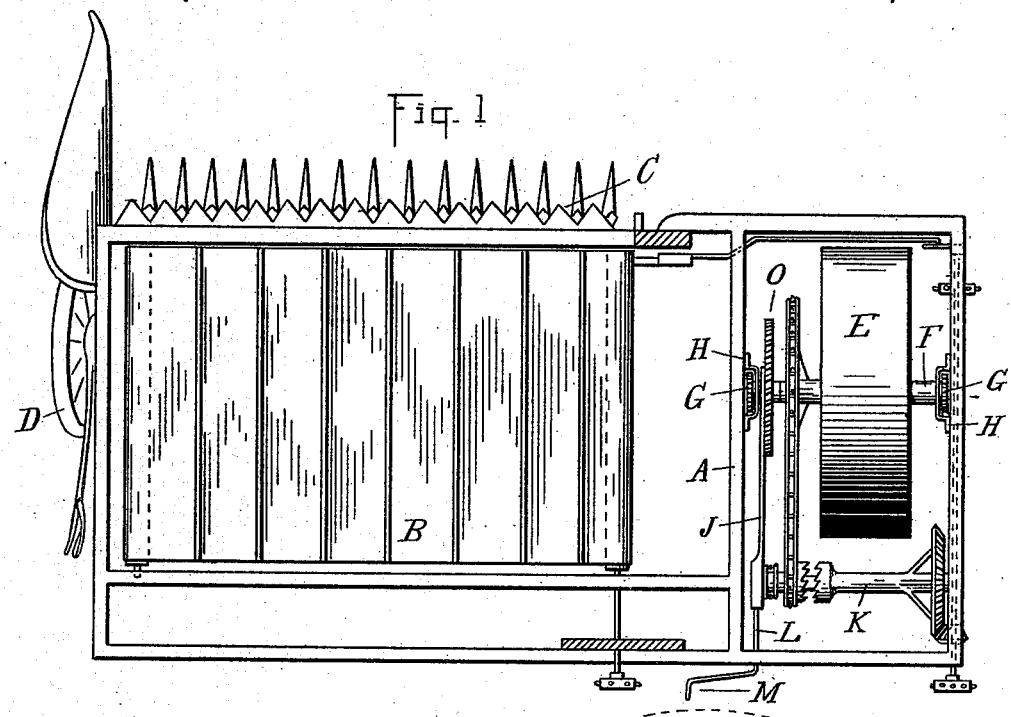
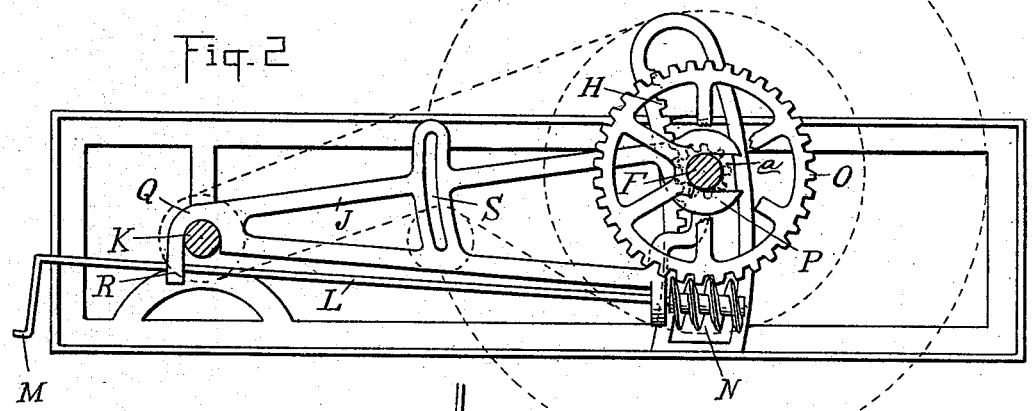
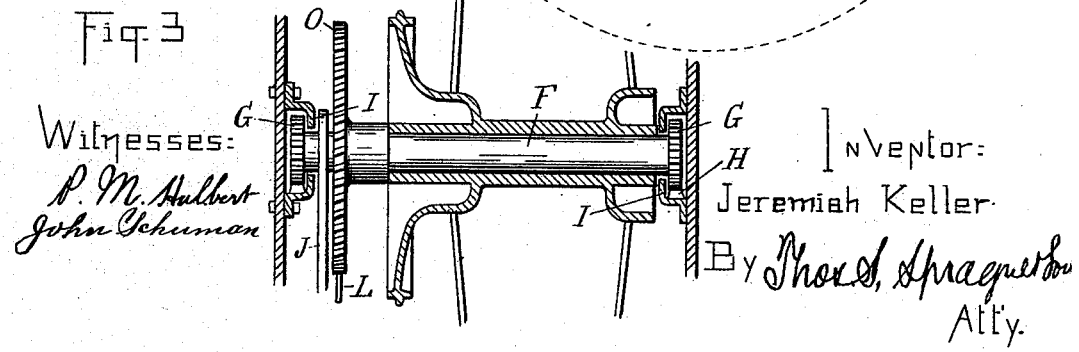
Witnesses:
P. M. Hulbert
John Schuman
Inventor:
Jeremiah Keller
By Thos. S. Sprague & Son
Att'y.

UNITED STATES PATENT OFFICE.

JEREMIAH KELLER, OF SANDUSKY, OHIO, ASSIGNOR TO OTTO KROMER, OF SAME PLACE.

DEVICE FOR RAISING AND LOWERING HARVESTERS OR GRAIN-BINDERS.

SPECIFICATION forming part of Letters Patent No. 412,627, dated October 8, 1889.

Application filed October 9, 1888. Serial No. 287,691. (No model.)

*To all whom it may concern:*

Be it known that I, JEREMIAH KELLER, a citizen of the United States, residing at Sandusky, in the county of Erie and State of Ohio, have invented certain new and useful Improvements in Devices for Raising and Lowering Harvesters or Grain-Binders, of which the following is a specification, reference being had therein to the accompanying drawings.

This invention relates to a new and useful improvement in a device for raising and lowering harvesters and binders; and the invention consists in the peculiar construction, arrangement, and combination of different parts of the device applied to the main drive-wheel of a harvester, by means of which the drive-wheel is susceptible of a vertical adjustment for the purpose of raising or lowering the harvester-platform which carries the cutting mechanism from or toward the ground.

In the drawings which accompany this specification, Figure 1 is a plan view showing my improvement applied to a harvester of known construction. Fig. 2 is a side elevation showing my improvement, and Fig. 3 is a horizontal section thereof.

A is the harvester-frame, provided with the platform B, cutting apparatus C, grain-wheel D, and main drive-wheel E, all of known construction and operation.

F is the axle, upon which the main drive-wheel is loosely journaled, and G G are pinions secured to the ends of the axle F, respectively.

H are two segmental circular racks, secured to the frame of the harvester in proper relative positions to the pinions G G to hold said pinions in engagement with the cogs of the racks, and these racks are preferably provided with the flanges I, which form a curved segmental slot in which the axle F is guided and its lateral displacement prevented.

J is a bracket, sleeved at one end upon the axle F and pivotally secured at its opposite end to the frame of the harvester, or preferably, as shown in the drawings, pivotally secured to the counter-shaft K of the drive mechanism of the harvester. L is a shaft mounted upon this bracket in suitable bearings and carrying at one end the handle M and at the other the worm N.

O is a worm gear-wheel secured upon the shaft F and engaging with the worm N.

In practice, the parts being arranged substantially as described, it will be seen that normally the engagement of the worm N with the worm gear-wheel O keeps the parts locked in position; but upon turning the handle M motion will be imparted to the worm gear-wheel O, and this motion is transmitted to the axle F and to the pinions G G, which are thereby compelled to travel up or down the track, thereby accomplishing the desired raising and lowering.

For the purpose of mounting and dismounting the device freely, I make the bearings P, by means of which the bracket engages with the axle F, open on one side, as shown at *a* in Fig. 2, so that the bracket may be readily engaged or disengaged with the axle, and for the same reason I make the pivotal bearing Q of the bracket open upon its lower side and provide it with the downwardly-projecting lug R, which forms a bearing for the shaft L, and in connection therewith prevents a disengagement of the bracket from the shaft K.

As it is usual to convey the motion from the drive-wheel to the counter-shaft K by means of a sprocket gear and chain, as shown, I preferably provide the bracket with the curved slot S, in which the tightener-sprocket is secured and carried with the bracket without disturbing the adjustment of the chain in raising and lowering.

The handle M preferably projects at the rear end of the harvester-frame for convenient access to operate the device.

What I claim as my invention is—

1. In a device for the purpose described, the combination, with the main wheel and the axle F, upon which it is journaled, of the pinions G G, secured to said axle, the counter-shaft K, the segmental circular slotted racks H, secured to the frame, the bracket J, pivotally secured at one end by an open bearing on said counter-shaft K and at the other end formed with an open bearing sleeved upon the axle F, the shaft L, mounted on said bracket, the worm N, secured upon said shaft, and the worm-gear O, mounted upon the axle, the parts being arranged to operate substantially as described.

2. The combination, with the axle F and shaft K, of a bracket J, having at its front end a bearing for the front end of the shaft L, and the open bearing P, by means of which the bracket is sleeved upon the axle F, the open bearing Q, by means of which said bracket is hinged to the shaft K, the worm-wheel, the segmental racks, the pinions, and the downwardly-projecting lug R, and the shaft L, journaled in said lug and provided at one end with a handle M and at the other with the worm N, substantially as described.

In testimony whereof I affix my signature, in presence of two witnesses, this 4th day of June, 1888.

JEREMIAH KELLER.

Witnesses:
   CH. ROEDER,
   J. ERSKENER.